United States Patent
Yeager et al.

(10) Patent No.: US 11,657,596 B1
(45) Date of Patent: *May 23, 2023

(54) SYSTEM AND METHOD FOR CASCADING IMAGE CLUSTERING USING DISTRIBUTION OVER AUTO-GENERATED LABELS

(71) Applicant: Medallia, Inc., San Francisco, CA (US)

(72) Inventors: Andrew J. Yeager, Mountain View, CA (US); Ji Fang, Mountain View, CA (US)

(73) Assignee: Medallia, Inc., San Francisco, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/248,046

(22) Filed: Jan. 6, 2021

Related U.S. Application Data

(63) Continuation of application No. 16/562,825, filed on Sep. 6, 2019, now Pat. No. 10,891,513, which is a
(Continued)

(51) Int. Cl.

| | |
|---|---|
| *G06V 10/762* | (2022.01) |
| *G06Q 30/0282* | (2023.01) |
| *G06V 30/262* | (2022.01) |
| *G06V 10/774* | (2022.01) |
| *G06F 18/214* | (2023.01) |
| *G06F 18/2413* | (2023.01) |
| *G06F 18/2415* | (2023.01) |
| *G06F 18/23211* | (2023.01) |

(Continued)

(52) U.S. Cl.
CPC .......... *G06V 10/763* (2022.01); *G06F 18/214* (2023.01); *G06F 18/23211* (2023.01); *G06F 18/2413* (2023.01); *G06F 18/2415* (2023.01); *G06Q 30/0282* (2013.01); *G06V 10/774* (2022.01); *G06V 30/274* (2022.01); *G06F 18/2178* (2023.01); *G06V 10/7784* (2022.01); *G06V 2201/10* (2022.01)

(58) Field of Classification Search
CPC ............ G06V 10/763; G06V 10/7784; G06V 30/274; G06V 2201/10; G06K 9/627; G06K 9/6222; G06K 9/6263; G06K 9/6277; G06Q 30/0282
See application file for complete search history.

(56) References Cited

U.S. PATENT DOCUMENTS

| | | | |
|---|---|---|---|
| 9,615,136 B1* | 4/2017 | Emery | ................... G06F 16/743 |
| 2009/0064008 A1* | 3/2009 | Liu | ..................... G06F 3/04883 |
| | | | 715/764 |
| 2017/0289764 A1* | 10/2017 | Yang | ..................... H04W 4/027 |

FOREIGN PATENT DOCUMENTS

EP 0555545 A1 * 8/1993

* cited by examiner

*Primary Examiner* — Daniel G Mariam

(57) ABSTRACT

Embodiments of the present invention provide a system that can be used to classify a feedback image in a user review into a semantically meaningful class. During operation, the system analyzes the captions of feedback images in a set of user reviews and determines a set of training labels from the captions. The system then trains an image classifier with the set of training labels and the feedback images. Subsequently, the system generates a signature for a respective feedback image in a new set of user reviews using the image classifier. The signature indicates a likelihood of the image matching a respective label in the set of training labels. Based on the signature, the system can allocate the image to an image cluster.

21 Claims, 12 Drawing Sheets

Related U.S. Application Data continuation of application No. 15/669,800, filed on Aug. 4, 2017, now Pat. No. 10,438,095.

(51) Int. Cl.
*G06V 10/778* (2022.01)
*G06F 18/21* (2023.01)

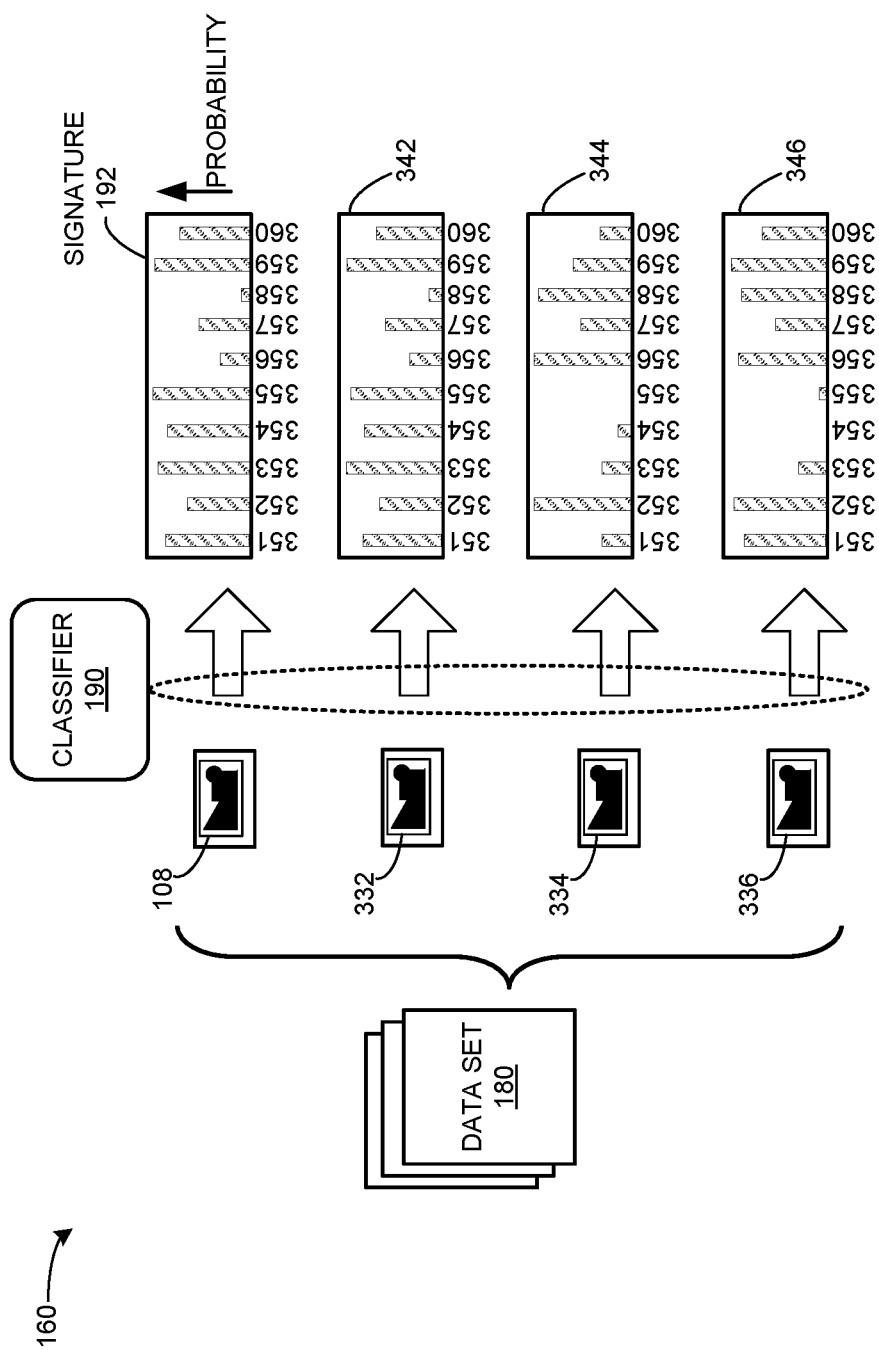

SYSTEM AND METHOD FOR CASCADING IMAGE CLUSTERING USING DISTRIBUTION OVER AUTO-GENERATED LABELS

RELATED APPLICATIONS

This disclosure is a continuation application and claims the benefit and priority to the U.S. application Ser. No. 16/562,825, which was filed on Sep. 6, 2018, which is a continuation application of the U.S. application Ser. No. 15/669,800, filed on Aug. 4, 2017 which is now issued as U.S. Pat. No. 10,438,095, all of which are incorporated herein by reference in their entirety.

BACKGROUND

Field

This disclosure is generally related to image clustering. More specifically, this disclosure is related to a method and system for cascading image clustering using distribution signature.

Related Art

With the advancement of computer and network technologies, various operations performed by users of different applications have led to extensive use of web services. This proliferation of the Internet and Internet-based user activity continues to create a vast amount of digital content. For example, multiple users may provide reviews about a business entity (e.g., a hotel or a restaurant) via different applications, such as mobile applications running on different platforms, as well as web-interfaces running on different browsers in different operating systems. Furthermore, users may also use different social media outlets to post their reviews about the business entity. The ubiquity of cameras on smartphones and the ease of sharing pictures have led to a large increase in the use of photos to provide feedback in a review.

Understanding image-based feedback is an increasingly important component of understanding a user review. To support this feature, the feedback images can be categorized based on the contents and/or themes of the images. Various image categorization techniques can be applied on the images to categorize the images posted with the reviews. Such image categorization typically uses supervised classification or unsupervised clustering. For example, supervised classification relies on a predefined list of category labels for training a classification model, which is then used to classify new images with the labels from the predefined list. On the other hand, unsupervised clustering can generate image clusters based on the features appearing in an image. However, such features can simply be noise and may not contribute to clustering images based on semantically meaningful categories.

Hence, although a number of methods are available for image categorization, some problems still remain in the classification of images into auto-generated and semantically meaningful categories.

SUMMARY

Embodiments of the present invention provide a system that can be used to classify a feedback image in a user review into a semantically meaningful class. During operation, the system analyzes the captions of feedback images in a set of user reviews and determines a set of training labels from the captions. The system then trains an image classifier with the set of training labels and the feedback images. Subsequently, the system generates a signature for a respective feedback image in a new set of user reviews using the image classifier. The signature indicates a likelihood (e.g., a probability) of the image matching a respective label in the set of training labels. Based on the signature, the system can allocate the image to an image cluster.

To allocate the image to the image cluster, the system can determine a difference between the signature and the current signatures in the image cluster. If the difference is below a threshold, the system allocates the image to the image cluster. The image cluster can also include neighbor images of the image (i.e., the images with the lowest distance from the image).

If the average difference between the images of two image clusters is below a threshold, the system can merge the image cluster with another image cluster.

Since the system can train the image classifier with a set of training labels, the system may need to determine the set of training labels. To do so, the system can parse the captions of the feedback images and identify a predetermined number of phrases most frequently appearing in the captions. The system then allocates these phrases as the training labels.

To generate the signature, the system computes the probability of the image matching a respective label in the set of training labels and stores the computed probabilities in a data structure (e.g., a vector) in a local storage device.

In the storage device, the system can store this data structure in association with an identifier of the image. As a result, the system can use the identifier of the image (e.g., as an input to a hash function or an index) to obtain the data structure.

It should be noted that, even though the system allocates the image to the image cluster based on the probability of the image matching a respective training label, the image cluster can correspond to a topic not represented in the set of training labels. For example, if the user reviews are for hotels, the system can allocate the image to an image cluster for "gym" without a corresponding label present in the signature.

BRIEF DESCRIPTION OF THE FIGURES

FIG. 3B illustrates an exemplary classification of feedback images based on a distribution signature over auto-generated labels, in accordance with an embodiment of the present invention.

In the figures, like reference numerals refer to the same figure elements.

DETAILED DESCRIPTION

Figure 1A:
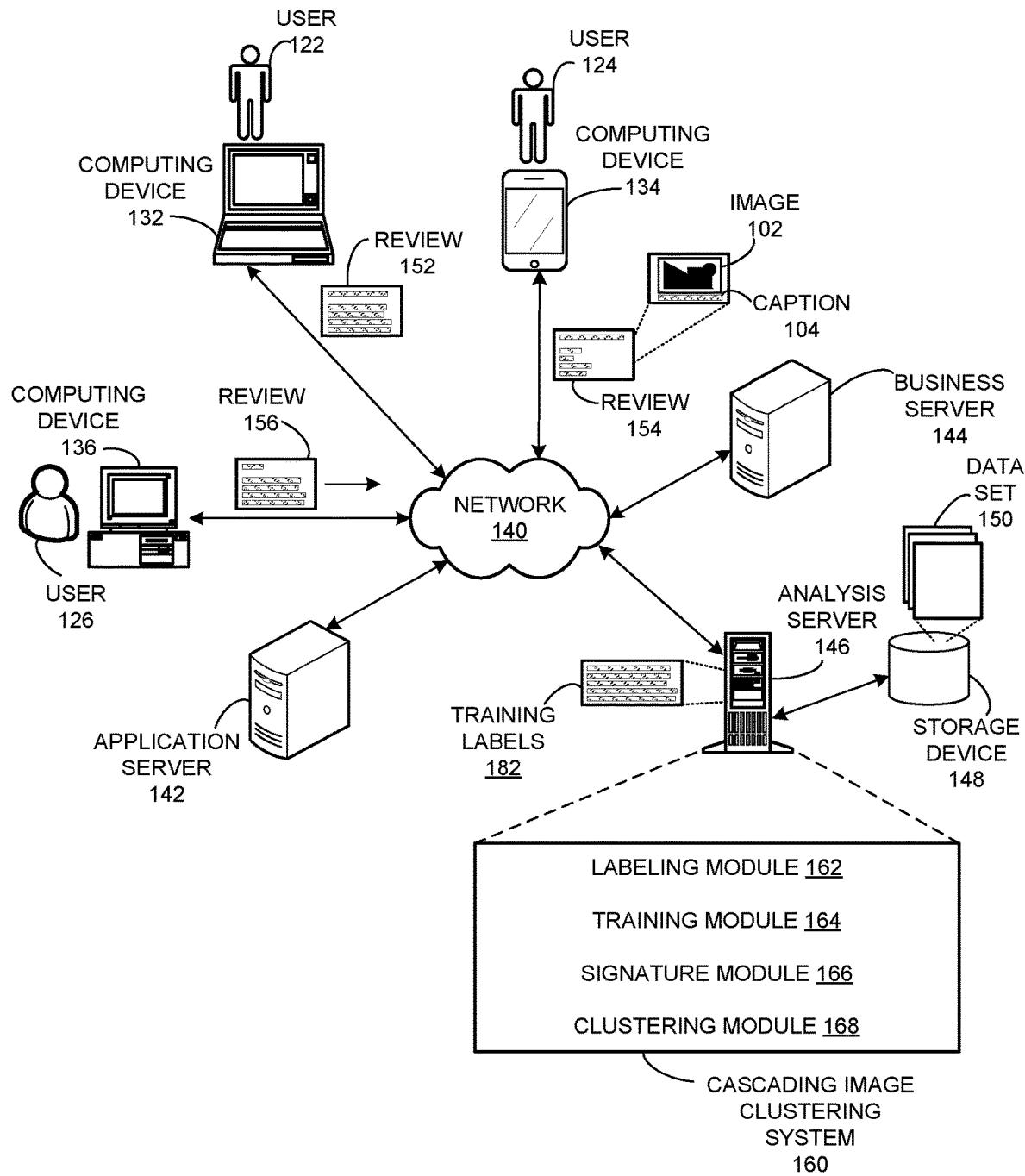
FIG. 1A illustrates an exemplary cascading image clustering system, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of classifying feedback images in user reviews into automatically defined and semantically meaningful categories by facilitating a system that clusters the feedback images based on respective probability signatures of the corresponding feedback images. The probability signature of an image indicates the respective probability of the image matching a set of labels.

Due to ease of access via the Internet, a large number of users can provide reviews about a business entity using one or more distributed services (e.g., TripAdvisor, Facebook, Twitter, Yelp, etc.). Such a review can include a textual description of the user's experience as well as one or more feedback images depicting the user's feedback. For example, a user may use a feedback image to express how amazing a view is or how unclean a room is. As a result, understanding feedback images has become a significant component of customer review analysis. To support this, the feedback images can be categorized according to the objects and/or themes in the images. Typically, machine learning techniques, such as supervised classification and unsupervised clustering, can be used for image categorization.

With existing technologies, training of the supervised classification technique usually relies on a large number of accurately and consistently labeled images. These labels can be generated by an administrator. As a result, training the supervised classification technique can become tedious and require significant involvement from the administrator. Furthermore, the supervised classification technique only provides high categorization accuracy for a predefined set of labels (e.g., the labels defined by the administrator). However, real-world user reviews may change and include images not matching the predefined labels. Therefore, a predefined set of labels may not be suitable for a large set of reviews since manually generating labels for all possible topics/categories of significance is not feasible.

On the other hand, the unsupervised technique may not derive clean and semantically meaningful categories. For example, all images with a black pixel in a corner could be used as a condition for image categorization. However, such a condition may not yield a meaningful image category that may provide real-world "human understanding" (in other words, a semantically meaningful category).

To solve this problem, embodiments of the present invention provide a cascading image clustering system that can automatically generate meaningful labels from user reviews, generate probability signatures for a respective feedback image based on the generated labels, and cluster the feedback images based on the probability signatures. During operation, the system analyzes the captions for the feedback images from the user reviews. The system can use parts of speech recognizer to identify a set of popular nouns (e.g., a room) and a set of popular noun-adjective pairs (e.g., a clean room) from the captions. In some embodiments, the system determines N most frequent nouns and M most frequent noun-adjective pairs from the captions. Here, the respective values of N and M can be predefined (e.g., by an administrator). The system assigns these nouns and noun-adjective pairs as training labels for the feedback images.

The system then trains an image classifier based on the training labels. This training allows the classifier to classify an image to a corresponding training label. For example, if a new feedback image is provided to the trained classifier, the classifier can determine a probability of that image being "a room." Upon completion of the training, the system uses the classifier on a new set of feedback images and determines a probability signature (or a signature) for a respective image of the new set. The signature indicates the probability of a feedback image corresponding to a respective training label. For example, if the set of training labels includes "room," "bathroom," "great view," and "clean lobby," the signature of a feedback image can indicate the respective probability of the image being an image depicting a room, a bathroom, a great view, and a clean lobby. The signature for an image of a room with a great view can indicate a high probability for "room" and "great view," and a low probability for "bathroom" and "clean lobby."

The system then calculates the similarity between two signatures of two feedback images to determine whether the two images belong to a same image cluster. In some embodiments, the system can use the cosine distance between the two signatures to determine the similarity. If the cosine distance between the two signatures is below a threshold, the system can determine that the two corresponding feedback images belong to a same cluster. For example, the system can calculate the cosine distance between the signature of an image and the signatures of the current images in a cluster (e.g., based on an average of the signatures). If the cosine distance is below a threshold, the system can allocate the image to the cluster. Here, a respective image cluster can represent a corresponding category for the images. For example, the system may group a respective image with a signature having a high probability of "room" and "great view" into a single cluster. In this way, the system can classify feedback images in user reviews into automatically defined and semantically meaningful categories.

Cascading Image Clustering System

FIG. 1A illustrates an exemplary cascading image clustering system, in accordance with an embodiment of the present invention. In this example, a large number of users 122, 124, and 126 of a business entity provide reviews 152, 154, and 156, respectively, about the business entity via a variety of computing devices 132, 134, and 136, respectively. Here, users 122, 124, and 126 can be considered as reviewers for the business entity. Suppose that a data set 150 is a set of reviews that includes reviews 152, 154, and 156. Examples of a review include, but are not limited to, a survey with numerical indicators, a social media post, and a review posted on a website. Such a business entity can be an entity in the hospitality business (e.g., a hotel, an event management company, a theme park, a transportation service provider, a cruise line, etc.).

These computing devices are coupled via a network 140, which can be a local or wide area network, to an application server 142 that provides a distributed service (e.g., TripAdvisor, Facebook, Twitter, Yelp, etc.). It should be noted that these reviews can be hosted on different servers associated with the corresponding service. The business entity can maintain a business server 144 coupled to network 140. Business server 144 can store the review information of the business entity provided by the distributed service. Such review information can include one or more of: a textual review, one or more feedback images, and one or more ranking scores (e.g., a ranking between 1 and 5, wherein 5 indicates the most positive feedback).

In this example, user 124 may include a feedback image 102 in review 154 and describe image 102 in a caption 104 (e.g., how amazing a view or how unclean a room is). As a result, understanding what feedback image 102 expresses has become a significant component of customer review analysis. To support this, feedback image 102 can be categorized according to the objects and/or themes in image 102. Typically, machine learning techniques, such as supervised classification and unsupervised clustering, can be used for the categorization of image 102.

With existing technologies, supervised classification relies on a predefined list of category labels for training a classification model, which is then used to classify image 102 with the labels from the predefined list. However, image 102 may not match any of the labels in the predefined list. On the other hand, unsupervised clustering can allocate image 102 to an image cluster based on a noise appearing in image 102. This approach may not produce a semantically meaningful categorization of image 102.

To solve this problem, embodiments of the present invention provide a cascading image clustering system 160. System 160 can include a labeling module 162 that can automatically generate a meaningful list 182 of training labels from data set 150. Labeling module 162 analyzes data set 150 to obtain captions of the feedback images. For example, since review 154 includes a feedback image 102 and a corresponding caption 104, labeling module 162 parses review 154 and obtains caption 104. Based on the most frequent nouns, adjectives, and/or noun-adjective pairs in the captions of the feedback images in data set 150, labeling module 162 generates list 182 of the training labels. Since these labels are generated from captions provided by the users, the labels are automatically generated and can be semantically meaningful (e.g., labels likely to be provided by humans).

Furthermore, system 160 includes a training module 164 that trains an image classifier on the feedback images in data set 150 based on list 182. When the classifier is trained, the classifier can be used to classify feedback images in a new data set. System 160 also includes a signature module 166 that generates probability signatures for a respective feedback image in data set 150 based on list 182. A signature of an image indicates a respective probability of the image being associated with a respective label in list 182. For example, the signature for image 102 includes a set of probabilities. A respective probability in the set corresponds to the probability of image 102 being associated with a corresponding label in list 182.

System 160 further includes a clustering module 168 that clusters the feedback images based on the probability signatures. Such a cluster can correspond to a particular object or theme in the feedback images. Since labels in list 182 can be semantically meaningful, the signatures generated based on labels in list 182 can provide semantically meaningful insight for a respective feedback image. As a result, when system 160 clusters the feedback images based on the signatures, the corresponding clusters can lead to a classification similar to that which a human may provide. In this way, system 160 can classify feedback images into automatically defined and semantically meaningful categories.

Figure 1B:
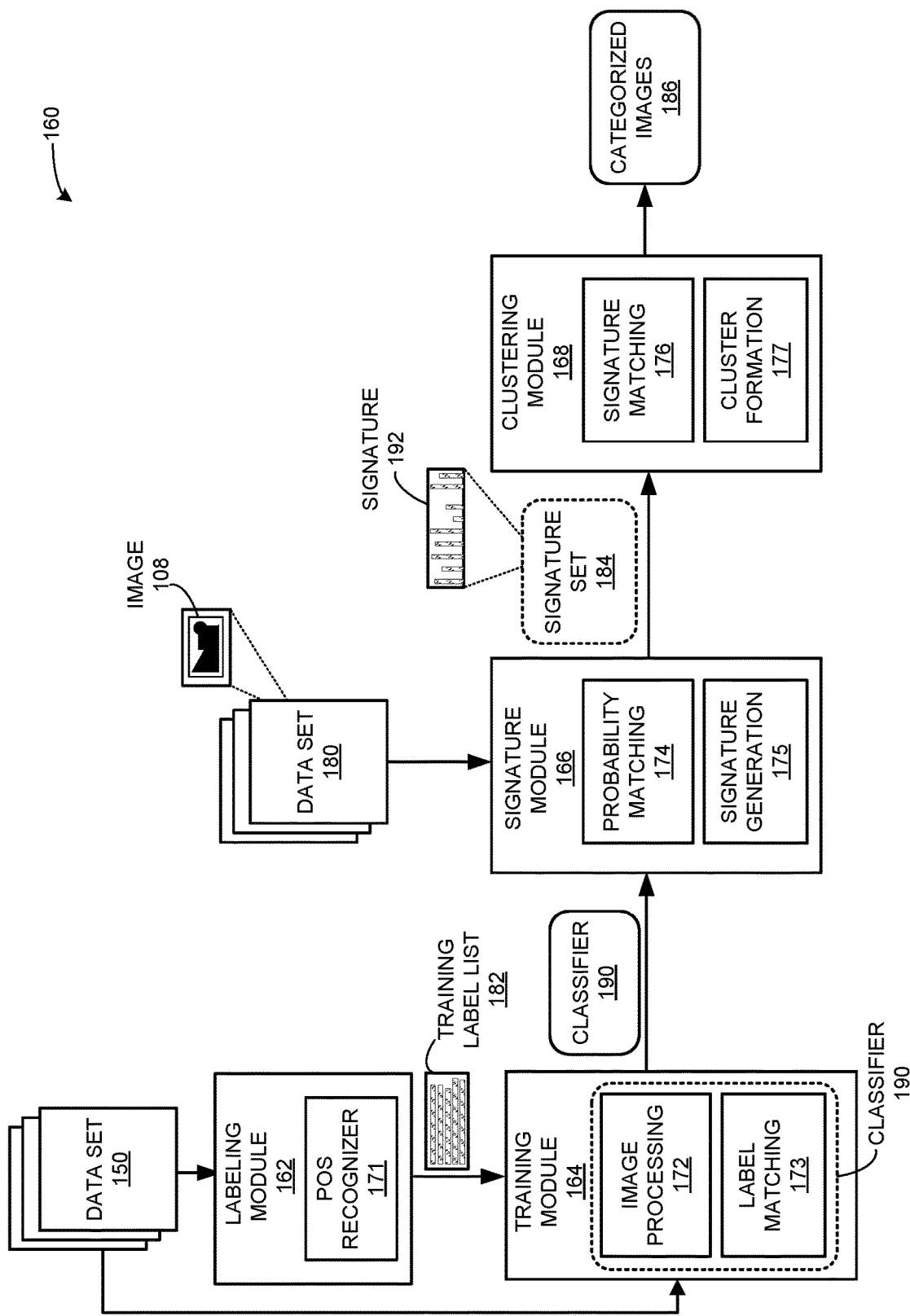
FIG. 1B illustrates exemplary components of a cascading image clustering system, in accordance with an embodiment of the present invention.

FIG. 1B illustrates exemplary components of a cascading image clustering system, in accordance with an embodiment of the present invention. During operation, labeling module 162 analyzes data set 150 to obtain captions of the feedback images in data set 150. In some embodiments, labeling module 162 can include a parts of speech (PoS) recognizer 171, which identifies a set of popular nouns (e.g., a room) and a set of popular noun-adjective pairs (e.g., a clean room) from the captions in data set 150. For example, labeling module 162 can determine N most frequent nouns and M most frequent noun-adjective pairs from the captions. Here, the respective values of N and M can be predefined (e.g., by an administrator). Labeling module 162 assigns these nouns and noun-adjective pairs as the training labels in list 182 for the feedback images in data set 150.

Training module 164 obtains list 182. It should be noted that list 182 includes labels for a respective feedback image in data set 150. Training module 164 trains an image classifier 190 based on training labels in list 182. In some embodiments, training module 164 can include an image processing mechanism 172 and a label matching mechanism 173. Image processing mechanism 172 can analyze a respective feedback image in data set 150 and generate one or more labels for the image. Label matching mechanism 173 matches the generated labels with the labels for that image in list 182. In this way, training module 164 trains classifier 190. This training allows classifier 190 to match an image to a corresponding training label. For example, if a new feedback image is provided to trained classifier 190, classifier 190 can determine a probability of that image being "a room."

Upon completion of the training, signature module 166 obtains classifier 190, which has been trained, and uses the trained classifier 190 on the feedback images of a new data set 180. It should be noted that data set 180 can be significantly larger than data set 150. Furthermore, since classifier 190 has already been trained based on data set 150, feedback images in data set 180 no longer need to have corresponding captions or other metadata. Signature module 166 includes a probability matching mechanism 174, which determines a respective probability of a respective training label in list 182. Signature generation mechanism 175 of signature module 166 then determines a signature for a respective feedback image of data set 180. Signature generation mechanism 175 repeats this process to generate signature set 184, which is the set of signatures generated for the feedback images of data set 180.

A respective signature in signature set 184 indicates the probability of a feedback image in data set 180 being associated with a respective label in list 182. Suppose that data set 180 includes a feedback image 108. If list 182 includes labels "room," "bathroom," "great view," and "clean lobby," a signature 192 of image 108 can indicate the respective probability of image 108 being an image depicting a room, a bathroom, a great view, and a clean lobby. For example, if image 108 is an image of a room with a great view, signature 192 can indicate a high probability for "room" and "great view," and a low probability for "bathroom" and "clean lobby."

Clustering module 168 then obtains signature set 184. Signature matching mechanism 176 of clustering module 168 calculates the similarity between each signature pair in signature set 184 to determine whether two images corresponding to the signature pair belong to a same image cluster. In some embodiments, signature matching mechanism 176 can use a cosine distance between the signature pair to determine the similarity. If the cosine distance between the signature pair is below a threshold, cluster formation mechanism 177 of clustering module 168 determines that the two corresponding images belong to a same cluster. Here, a respective image cluster can represent a corresponding category for the images. For example, cluster formation mechanism 177 may group a respective image with a signature having a high probability of "room" and "great view" into a single cluster.

Cascading Image Clustering

Figure 2:
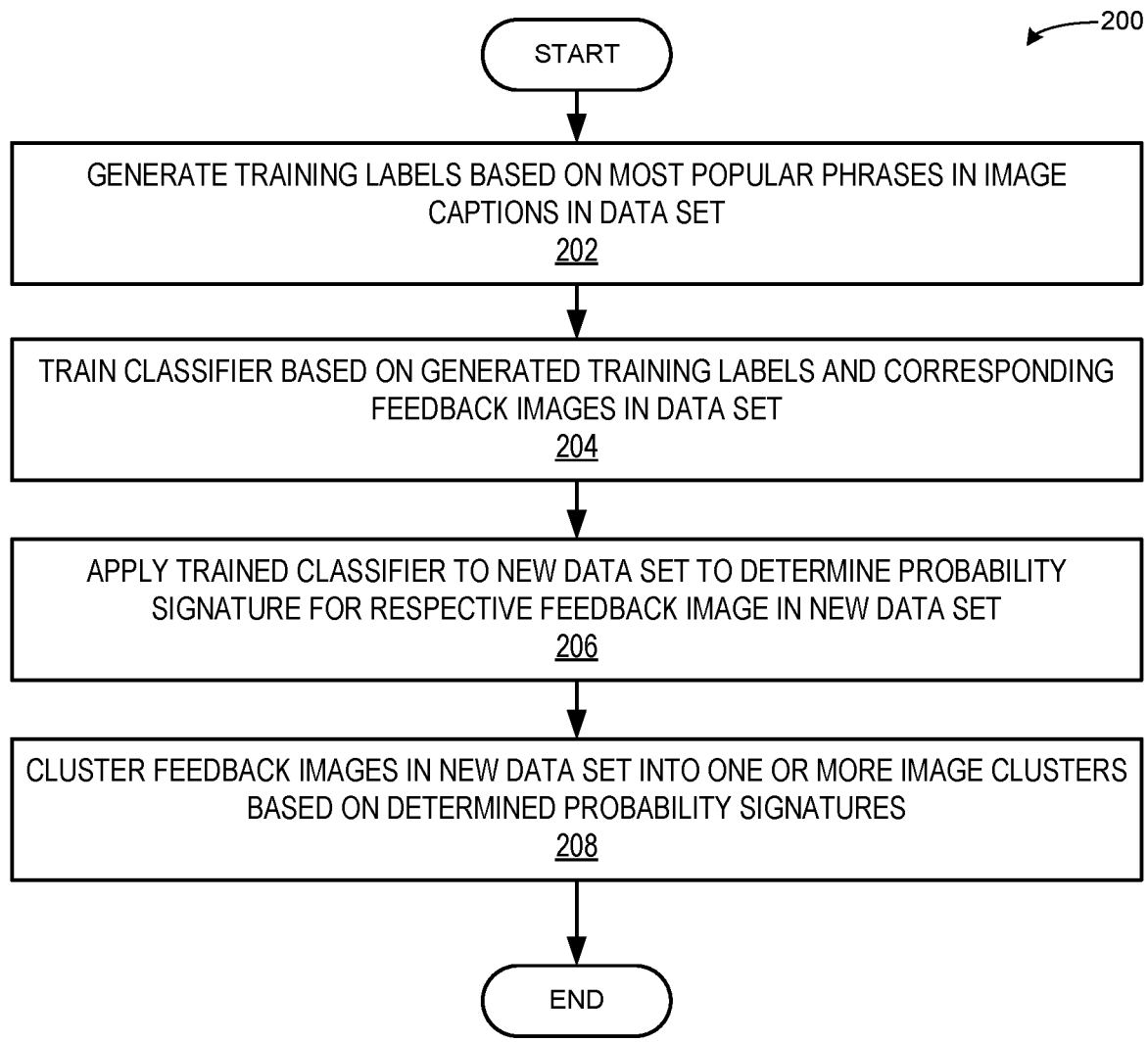
FIG. 2 presents a flowchart illustrating a method of a cascading image clustering system categorizing feedback images, in accordance with an embodiment of the present invention.

FIG. 2 presents a flowchart illustrating a method 200 of a cascading image clustering system categorizing feedback images, in accordance with an embodiment of the present invention. During operation, the system generates training labels based on the most popular phrases (e.g., nouns, adjectives, and/or noun-adjective pairs) in the image captions in a data set (operation 202). The system then trains a classifier based on the generated training labels and the corresponding feedback images in the data set (operation 204). The system applies the trained classifier to a new data set to determine a probability signature for a respective feedback image in the new data set (operation 206). The system clusters the feedback images in the new data set into one or more image clusters based on the determined probability signatures (operation 208).

Figure 3A:
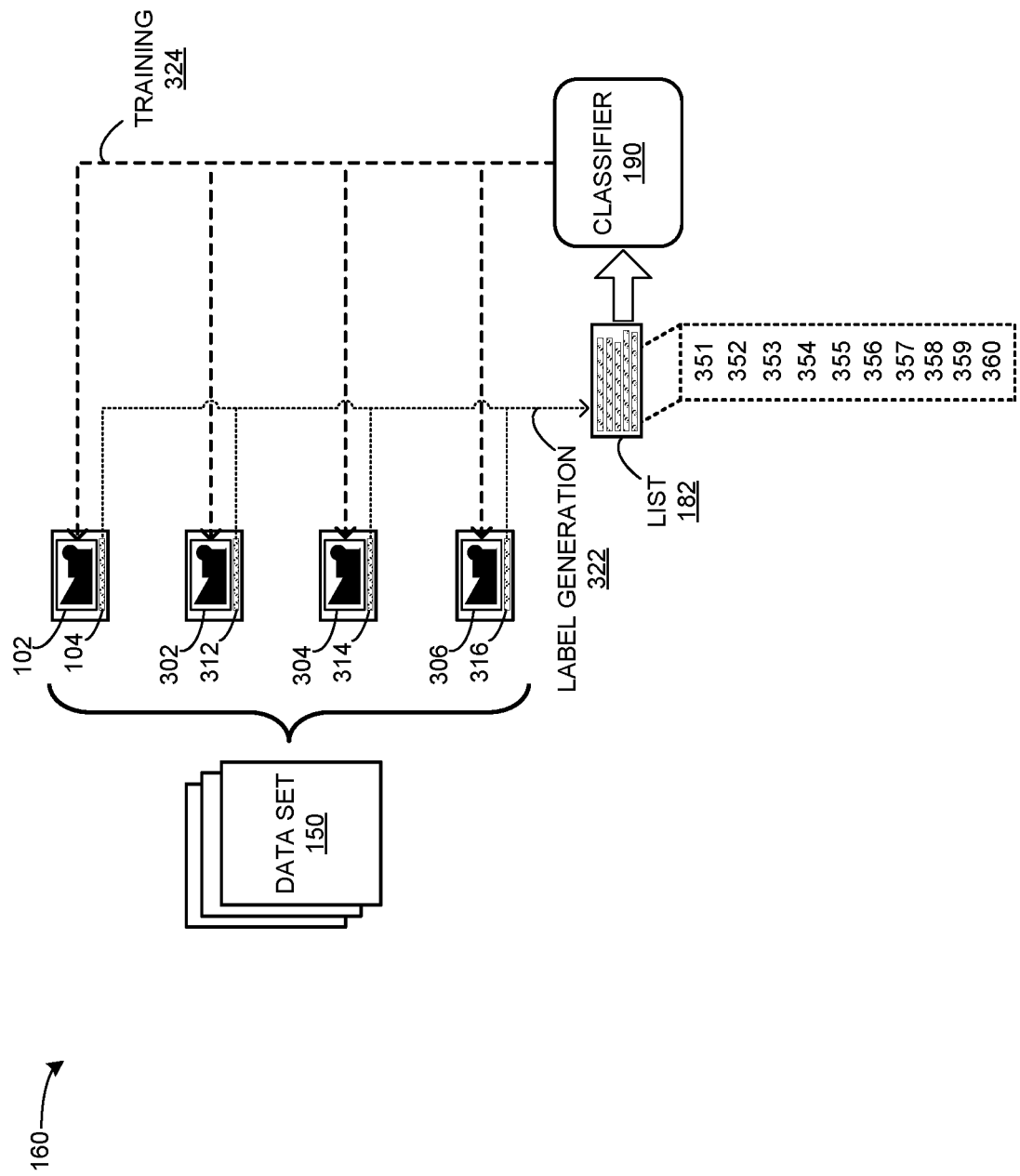
FIG. 3A illustrates an exemplary training of an image classifier based on auto-generated labels, in accordance with an embodiment of the present invention.

FIG. 3A illustrates an exemplary training of an image classifier based on auto-generated labels, in accordance with an embodiment of the present invention. In this example, data set 150 includes feedback images 102, 302, 304, and 306, and their corresponding captions 104, 312, 314, and 316. In the example in FIG. 1A, these feedback images can appear in one or more of reviews 152, 154, and 156. System 160 executes a label generation process 322 to generate training labels in list 182. Label generation process 322 can include obtaining captions 104, 312, 314, and 316, and using a parts of speech recognizer to identify a set of popular phrases from captions 104, 312, 314, and 316.

Label generation process 322 assigns these popular phrases as the training labels in list 182 for the feedback images in data set 150. Suppose that the training labels in list 182 include labels 351, 352, 353, 354, 355, 356, 357, 358, 359, and 360. System 160 applies a training process 324 to classifier 190 based on the labels in list 182. Training process 324 matches feedback images 102, 302, 304, and 306 with corresponding training labels and trained classifier 190.

FIG. 3B illustrates an exemplary classification of feedback images based on a distribution signature over auto-generated labels, in accordance with an embodiment of the present invention. In this example, a new data set 180 includes feedback images 108, 332, 334, and 336. System 160 uses trained classifier 190 on images 108, 332, 334, and 336 to determine signatures 192, 342, 344, and 346, respectively. A signature 192 can include the probability of image 108 being associated with labels 351, 352, 353, 354, 355, 356, 357, 358, 359, and 360. For example, if image 108 is an image of a room and labels 355 and 358 indicate "bed" and "lobby," signature 192 can indicate a high probability for label 355 and a low probability for label 358. On the other hand, if image 334 is an image of the check-in area of a hotel, signature 344 can indicate a high probability for label 358 and a low probability for label 355.

In some embodiments, a respective signature is generated as a set of probability values (e.g., between 0 and 1) with each value corresponding to one of labels 351, 352, 353, 354, 355, 356, 357, 358, 359, and 360. The set of probability values can be stored in a sequence in a data structure (e.g., an array, a vector, a list, etc.). Since each element of the data structure corresponds to a label, system 160 can use the index of a respective element of the data structure to determine the label. For example, if the first index of the data structure is "0" (e.g., as used in an array), system 160 determines that the value stored in the element indexed with 3 corresponds to label 354.

Figure 3C:
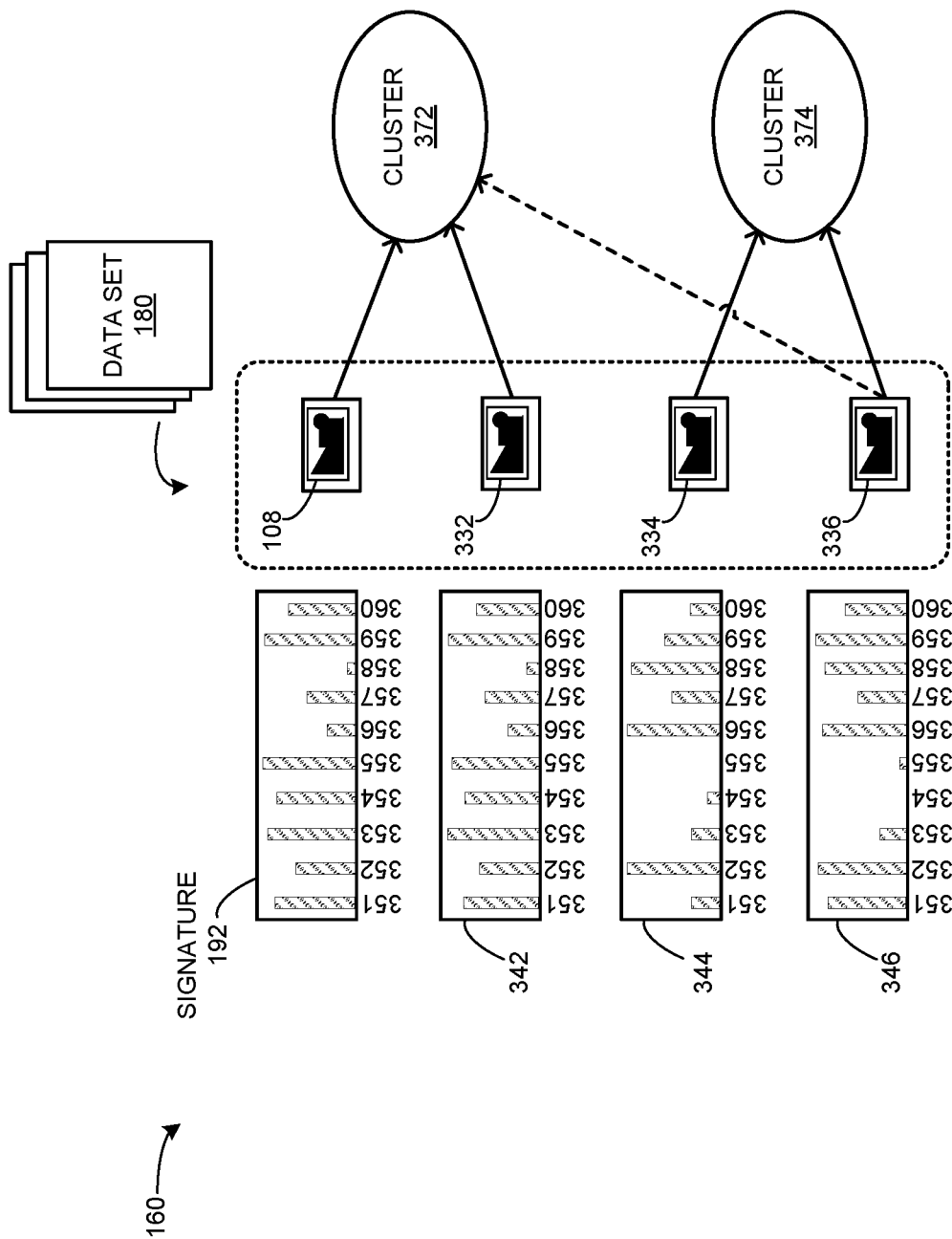
FIG. 3C illustrates an exemplary clustering of feedback images based on distribution-signature-based classification, in accordance with an embodiment of the present invention.

FIG. 3C illustrates an exemplary clustering of feedback images based on distribution-signature-based classification, in accordance with an embodiment of the present invention. Upon generation of signatures 192, 342, 344, and 346, system 160 uses these signatures to cluster feedback images 108, 332, 334, and 336, respectively. System 160 calculates the similarity between each signature pair to determine whether two images corresponding to the signature pair belong to a same image cluster. System 160 can use a cosine distance between the signature pair to determine the similarity. For example, if signatures 192 and 342 are represented by two vectors, as described in conjunction with FIG. 3B, the cosine distance of these two vectors can be derived by using the Euclidean dot product formula.

If the cosine distance between signatures 192 and 342 is below a threshold, system 160 allocates corresponding images 108 and 332 to a cluster 372. For example, if signatures 192 and 342 have a high probability of "room" and "great view," system 160 may group images 108 and 332 into cluster 372. In the same way, if the cosine distance between signatures 344 and 346 is below the threshold, system 160 allocates corresponding images 334 and 336 to a cluster 374. This allows system 160 to classify images 108 and 332 to one class and images 334 and 336 into another class in a semantically meaningful way.

If the signature of an image matches multiple clusters, system 160 can allocate the image to the cluster with the lower cosine distance or allocate the image to all clusters. For example, if respective cosine distances between signatures 346 and 342, and between signatures 346 and 344 are below the threshold, image 336 can be associated with both clusters 372 and 374. Alternatively, if the cosine distance between signatures 346 and 344 is lower, system 160 can allocate image 336 to cluster 374 instead of cluster 372 (denoted with a dashed arrow). On the other hand, if respective cosine distances between signatures 346 and 342, and between signatures 346 and 344 are above the threshold, image 336 may not be associated with any cluster. As a result, an image can belong to a single cluster, multiple clusters, or no cluster.

In this way, system 160 can classify the feedback images in data set 180 in a semantically meaningful way. Here, the cascading image clustering (i.e., multi-stage image clustering) automates the label generation and finds meaningful clustering based on the labels. Furthermore, the signature-based clustering approach of system 160 can find useful clusters on topics not present in list 182. Suppose that data set 180 includes reviews of hotels. System 160 then can generate an image cluster for "gym" without a corresponding label present in a signature (i.e., not in list 182). This indicates that cosine distances among signatures allow system 160 to capture semantically meaningful connections among feedback images.

For example, the signatures with high probability values for "room," "center," "area," and "lobby," and with low probability values for "dining area," "hallway," "toilet," and "bar" can cause system 160 to group the corresponding images into an image cluster. This cluster can represent images of gymnasiums in hotels even though list 182 may not include a label for "gym." In the same way, system 160 can generate atypical yet semantically meaningful clusters, such as "turn-down service," "animals," "stage performances," and "underwater photos."

Operations

Figure 4A:
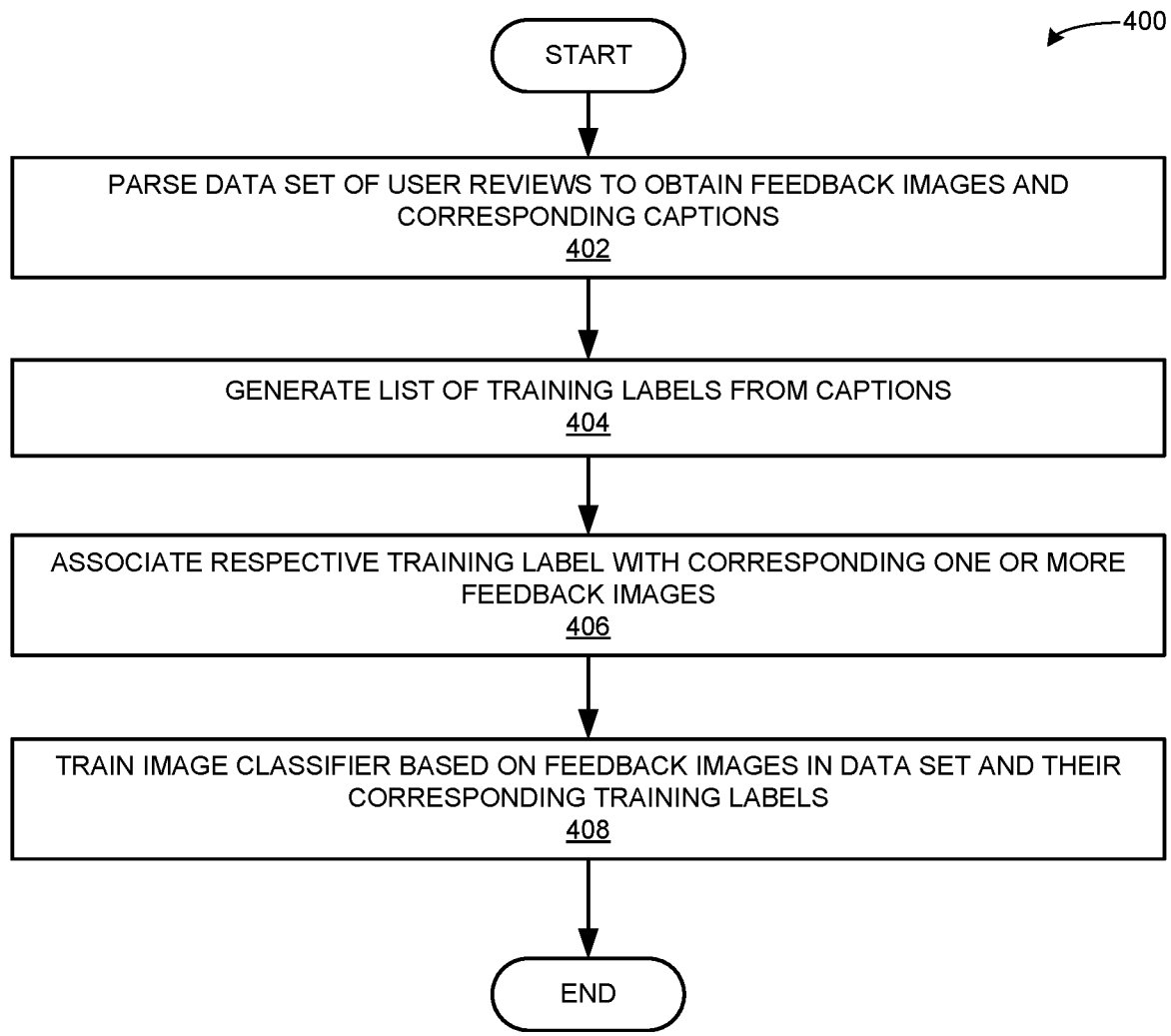
FIG. 4A presents a flowchart illustrating a method for training an image classifier based on auto-generated labels, in accordance with an embodiment of the present invention.

FIG. 4A presents a flowchart illustrating a method 400 for training an image classifier based on auto-generated labels, in accordance with an embodiment of the present invention. During operation, a cascading image clustering system parses a data set of user reviews to obtain feedback images of the data set and the corresponding captions (operation 402). The system then generates a list of training labels (or training phrases) from the captions (operation 404). In some embodiments, the system identifies the most popular phrases in the captions and selects the phrases as the training labels. The system associates a respective training label with one or more corresponding feedback images (operation 406) and trains an image classifier based on the feedback images in the data set and their corresponding training labels (operation 408).

Figure 4B:
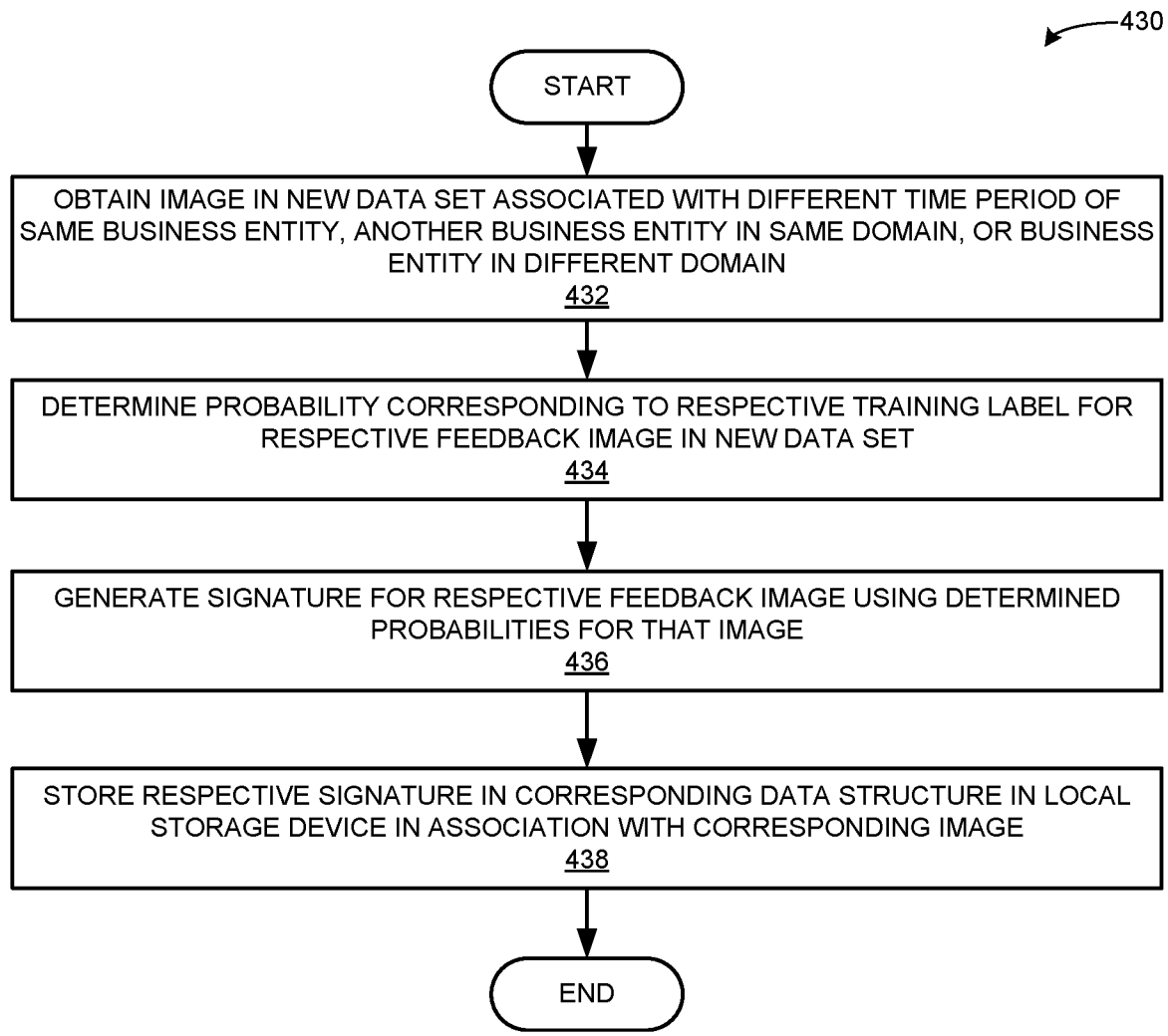
FIG. 4B presents a flowchart illustrating a method for classifying feedback images based on a distribution signature over auto-generated labels, in accordance with an embodiment of the present invention.

FIG. 4B presents a flowchart illustrating a method 430 for classifying feedback images based on a distribution signature over auto-generated labels, in accordance with an embodiment of the present invention. During operation, a cascading image clustering system obtains a new data set associated with a different time period of the same business entity, another business entity in the same domain (e.g., another business entity in the same industry), or a different domain (e.g., another business entity in another industry) (operation 432). The system determines the probability corresponding to a respective training label for a respective feedback image in the new data set (operation 434). The system then generates a signature for a respective feedback image using the determined probabilities for that image (operation 436). The system stores a respective signature in a corresponding data structure in a local storage device in association with a corresponding image (operation 438).

In some embodiments, a respective feedback image in a data set can be identified by an image identifier. The signature for that image can be identified using the image identifier. An image identifier can include one or more of: a data set identifier identifying the data set and an internal identifier identifying the image within that data set. This allows the system to uniquely identify a respective image of a respective data set. The data structure storing a signature can be obtained from the storage device based on the image identifier of the corresponding image.

Figure 4C:
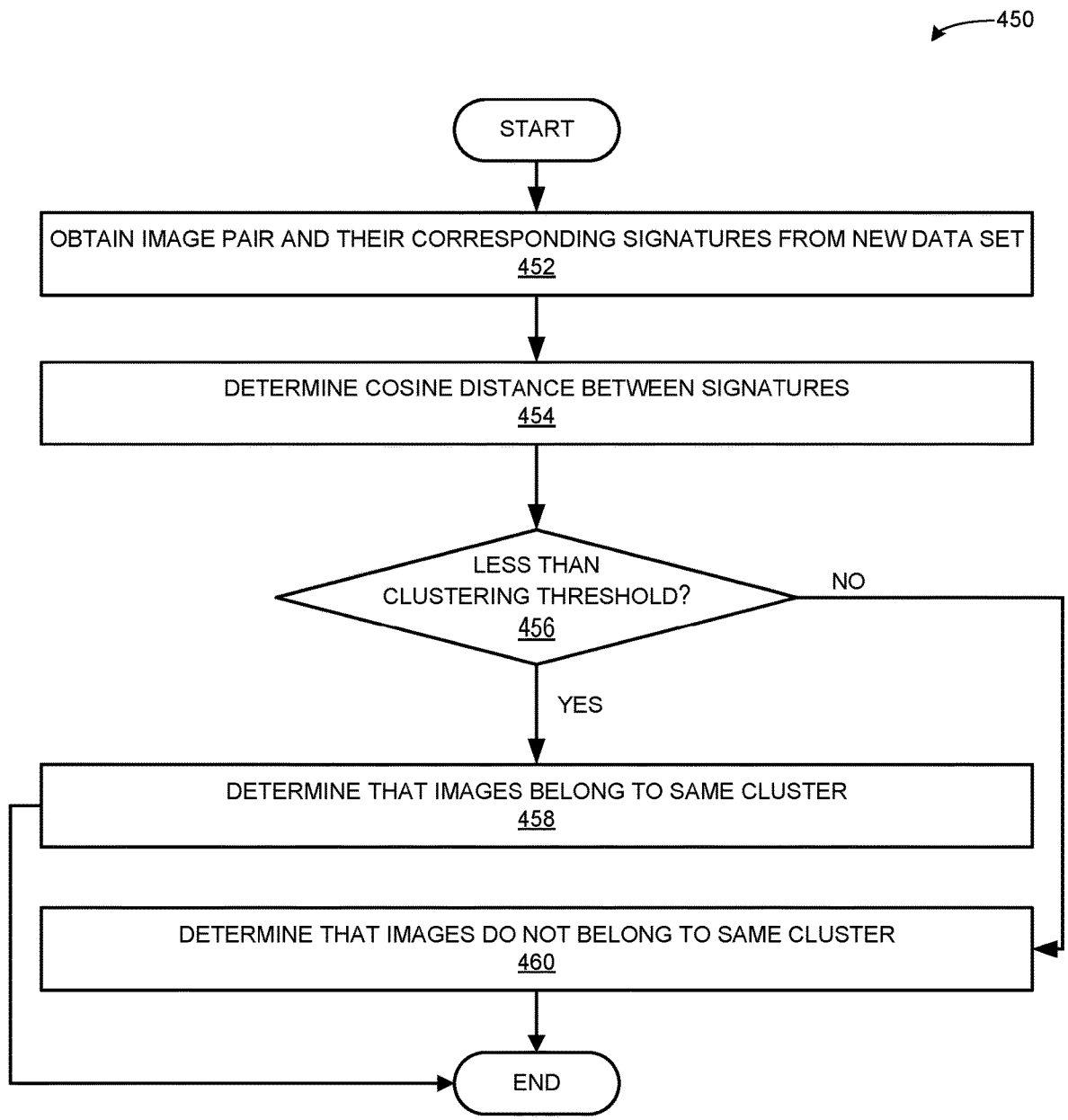
FIG. 4C presents a flowchart illustrating a method for clustering feedback images based on distribution-signature-based classification, in accordance with an embodiment of the present invention.

FIG. 4C presents a flowchart illustrating a method 450 for clustering feedback images based on distribution-signature-based classification, in accordance with an embodiment of the present invention. During operation, a cascading image clustering system obtains an image pair and their corresponding signatures from a new data set (operation 452). The system determines a cosine distance between the signatures (operation 454) and checks whether the distance is less than a clustering threshold (operation 456). If the distance is less than a clustering threshold, the system determines that the images belong to a same cluster (operation 458). Otherwise, the system determines that the images do not belong to a same cluster (operation 460).

Image Clustering

Figure 5A:
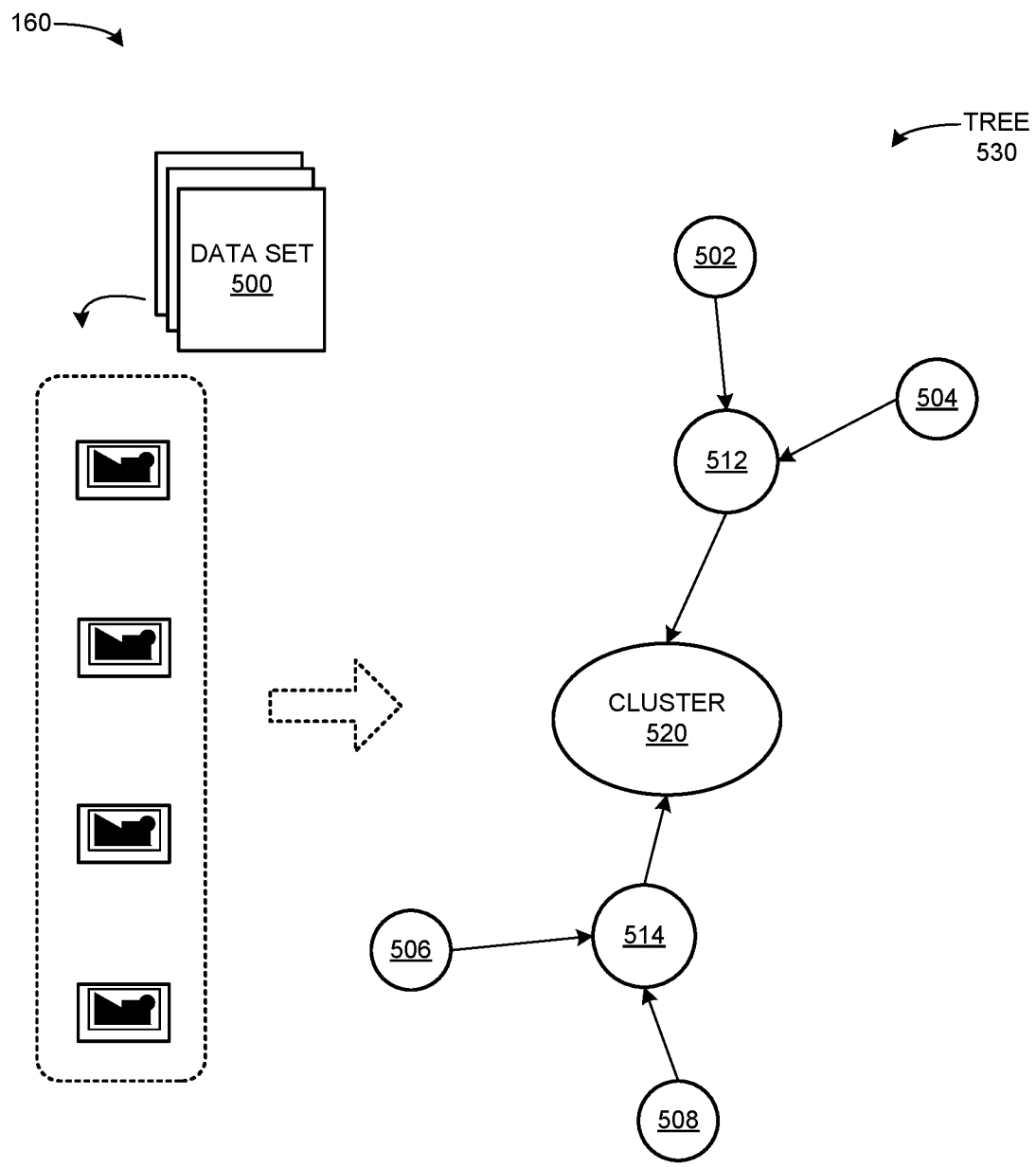
FIG. 5A illustrates an exemplary image clustering based on auto-generated seed clusters, in accordance with an embodiment of the present invention.

FIG. 5A illustrates an exemplary image clustering based on auto- generated seed clusters, in accordance with an embodiment of the present invention. The system initiates the clustering process by creating a set of "seed clusters." Seed clusters can be initial clusters that are further combined to obtain the target clusters (i.e., the clusters corresponding to semantically meaningful classes). Therefore, the number of seed clusters, S, can be larger than the number of target clusters, T (i.e., S>>T). The goal of generating the seed clusters is to over-cluster the feedback images in data set 500 such that a respective seed cluster includes images that belong to a same class. At the same time, a number of seed clusters may represent the same topic. The number of seed clusters, S, can be determined based on empirical data. For example, system 160 can determine S based on the number of feedback images (e.g., if the number of feedback images falls within a range of values, system 160 selects a corresponding S). The value of S can also be configured by an administrator.

During operation, system 160 randomly chooses an initial feedback image from a data set 500. Data set 500 includes a set of reviews, a number of which include feedback images. System 160 selects a set of feedback images within a threshold distance (e.g., a predetermined value) of the initial image from data set 500. It should be noted that the distance between two images can be determined by the cosine distance between the respective signatures of the two images. Images in this set can be referred to as neighbor images of the initial image. System 160 creates an initial seed cluster 502 comprising the initial image and its neighbor images.

System 160 then creates the next seed cluster 504 by selecting the feedback image with the largest average distance from the images in seed cluster 502. System 160 selects the next seed cluster 506 by selecting the feedback image in data set 500 with the furthest average distance from the images in all previous seed clusters (e.g., clusters 502 and 504). In the same way, system 160 generates the next seed cluster 508 by selecting the feedback image in data set 500 with the furthest average distance from the images in all previous seed clusters (e.g., clusters 502, 504, and 506). System 160 continues to generate seed clusters until the current number of the seed clusters reaches the value of S.

Upon generating the seed clusters, system 160 iteratively selects the two most similar seed clusters and determines whether these two seed clusters should be merged into a new cluster. System 160 can determine the similarity between two clusters by determining the average distances between the images of the two clusters. System 160 merges the two selected clusters into a new cluster if the average distance between a respective cluster-pair that have been previously merged is below a threshold. This ensures that a cluster generated by system 160 does not become significantly different than the initial seed cluster it started from.

For example, system 160 can select seed clusters 502 and 504. Since clusters 502 and 504 have not been merged with another cluster, system 160 merges clusters 502 and 504 into a new cluster 512 if the average distance between clusters 502 and 504 is below a threshold. In the same way, system 160 merges clusters 506 and 508 into a new cluster 514. System 160 iteratively selects clusters 512 and 514 as the most similar clusters and determines whether clusters 512 and 514 should be merged into a new cluster. System 160 merges clusters 512 and 514 into a new cluster if the average distance between a respective cluster-pair that have been previously merged is below a threshold.

For example, system 160 checks the average distances between clusters 502 and 506, clusters 502 and 508, clusters 504 and 506, and clusters 504 and 508. If each of the average distances is below a threshold, system 160 merges clusters 512 and 514 into a new cluster 520. If no more mergers are feasible, system 160 stops the clustering process. This clustering process generates a set of binary trees. In some embodiments, system 160 can allocate a semantic label to a respective root of a binary tree (e.g., based on a user input). Suppose that system 160 generates binary tree 530 representing the feedback images of hotel rooms. System 160 can allocate the label "rooms" to the root (e.g., based on a user input). Any subsequent new images allocated to binary tree 530 receives the label "rooms." This label set can be independent of list 182 and can be larger or smaller depending on the data. Therefore, the list of output labels may not be predefined. Traversing down the tree represents finer levels of granularity. Suppose that cluster 520 is the root of binary tree 530. If tree 530 represents "rooms" in hotels review, the sub-tree rooted at cluster 512 can represent clean rooms and the sub-tree rooted at cluster 514 can represent rooms with a great view.

Figure 5B:
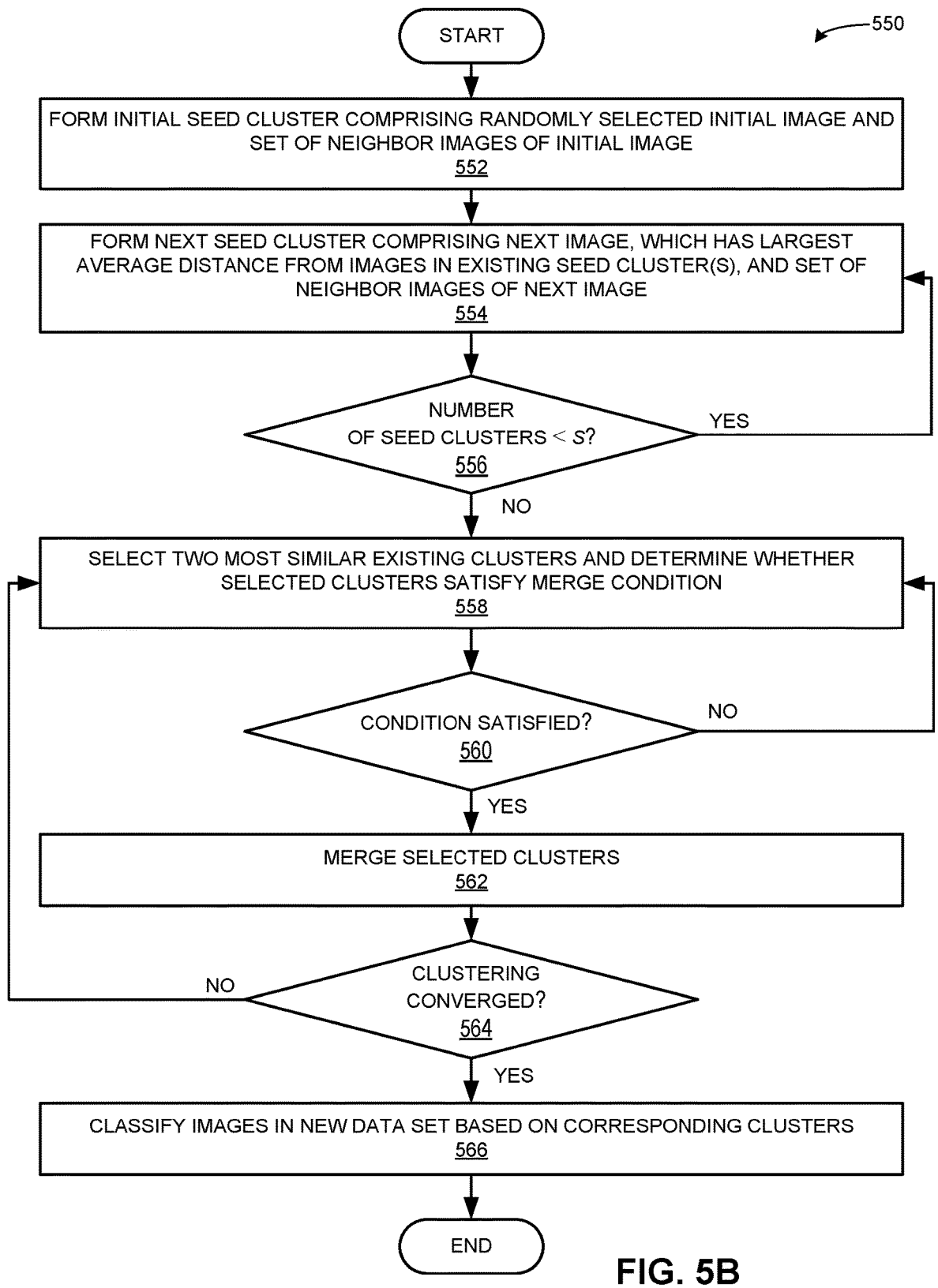
FIG. 5B presents a flowchart illustrating a method for image clustering based on auto-generated seed clusters, in accordance with an embodiment of the present invention.

FIG. 5B presents a flowchart illustrating a method 550 for image clustering based on auto-generated seed clusters, in accordance with an embodiment of the present invention. During operation, a cascading image clustering system forms an initial seed cluster comprising a randomly selected image and a set of neighbor images of the initial image (operation 552). The system forms a next seed cluster comprising a next image, which has the largest average distance from the images in the existing (i.e., the initial) seed cluster, and a set of neighbor images of the next image (operation 554). The system then checks whether the number of seed clusters is less than S (as described in conjunction with FIG. 5A) (operation 556).

If the number of seed clusters is less than S, the system continues to form a next seed cluster comprising a next image, which has the largest average distance from the images in the existing seed clusters, and a set of neighbor images of the next image (operation 554). On the other hand, if the number of seed clusters reaches S, the system selects two most similar existing clusters and determines whether the selected clusters satisfy a merge condition (operation 558). In some embodiments, the merge condition indicates, for any two existing clusters, whether the average distance between a respective cluster-pair in the existing clusters that have been previously merged is below a threshold.

If the selected clusters satisfy the merge condition (operation 560), the system merges the selected clusters (operation 562) and determines whether the clustering process has been converged (as described in conjunction with FIG. 5A) (operation 564). If the clustering process has been converged, the system classifies the images in the new data set based on the corresponding clusters (operation 566). If the selected clusters do not satisfy the merge condition (operation 560) or the clustering process has not been converged (operation 564), the system selects the next two most similar existing clusters and determines whether the selected clusters satisfy a merge condition (operation 558).

Exemplary Computer and Communication System

Figure 6:
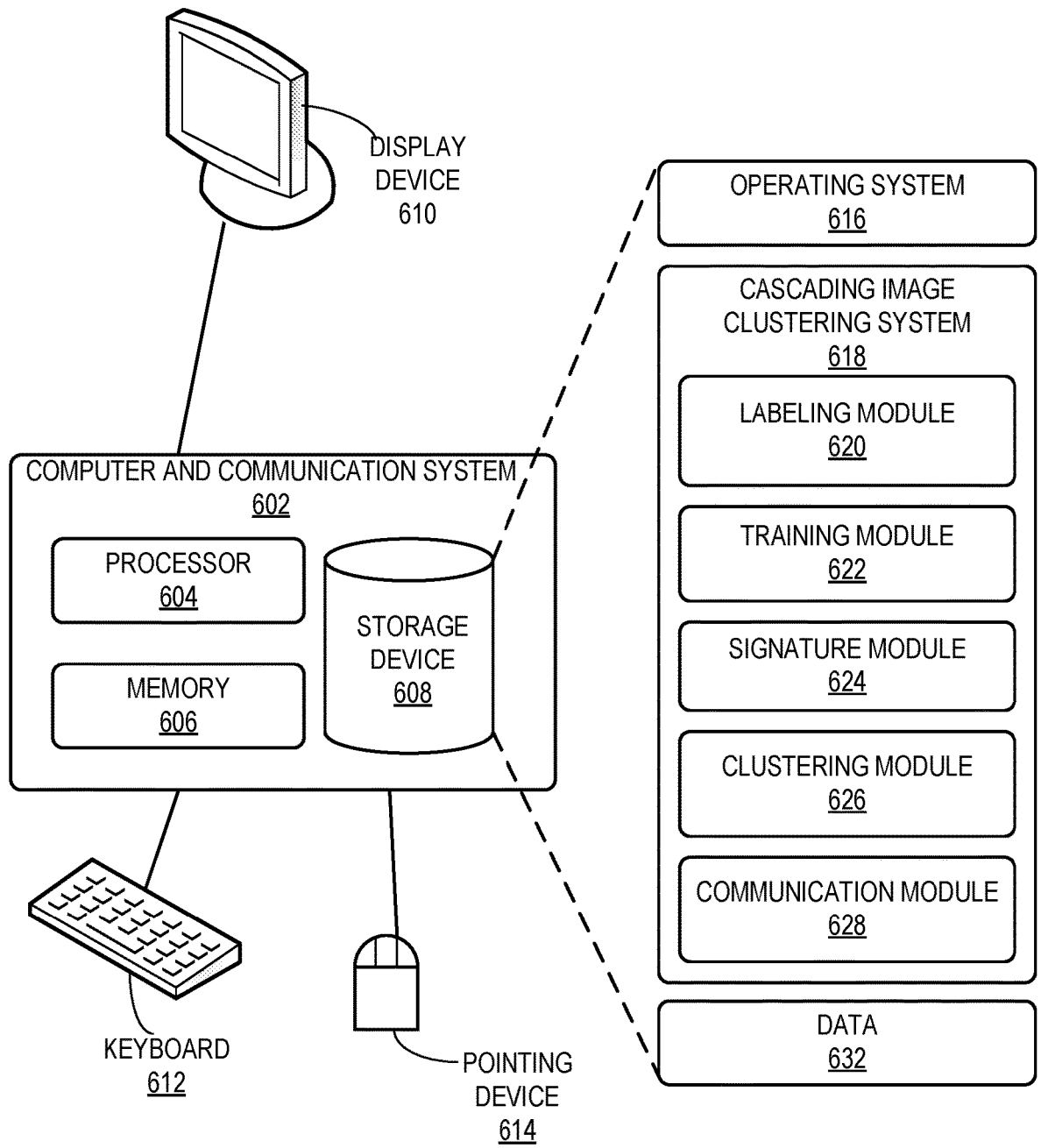
FIG. 6 illustrates an exemplary computer and communication system that facilitates a cascading image clustering system, in accordance with an embodiment of the present invention.

FIG. 6 illustrates an exemplary computer and communication system that facilitates a cascading image clustering system, in accordance with an embodiment of the present invention. A computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a cascading image clustering system 618, and data 632.

Cascading image clustering system 618 can include instructions, which when executed by computer and communication system 602, can cause computer and communication system 602 to perform the methods and/or processes described in this disclosure. Cascading image clustering system 618 includes instructions for analyzing the captions of feedback images in the reviews of a data set (labeling module 620). Cascading image clustering system 618 can also include instructions for identifying the most popular phrases from the captions and designating the phrases as training labels for an image classifier (labeling module 620). Cascading image clustering system 618 further includes instructions for training the image classifier using the feedback images and the training labels (training module 622).

Cascading image clustering system 618 can also include instructions for determining probability signatures for a respective feedback image of the reviews in a new data set (signature module 624). Cascading image clustering system 618 can include instructions for clustering the images of the new data set into one or more image clusters based on the signatures of the images (clustering module 626). Cascading image clustering system 618 can include instructions for classifying the images of the new data set based on the clustering (clustering module 626). In some embodiments, cascading image clustering system 618 can include instructions for displaying, via display device 610 using a graphical or textual interface, the classifications to an administrator (clustering module 626).

Cascading image clustering system 618 can also include instructions for exchanging information with other devices (communication module 628). Data 632 can include any data that is required as input or that is generated as output by the methods and/or processes described in this disclosure.

Data 632 can include one or more of: a data set, a list of training labels, a new data set, a corresponding signature for a respective feedback image in the new data set, and clustered images.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating cascading image clustering, the method comprising:
   selecting an initial image from a set of reviews and further selecting a set of neighboring images to form an initial seed cluster;
   repeating the selecting a number of times with a different image and a different set of neighboring images from the set of reviews, wherein the selecting and the repeating forms a plurality of seed clusters;
   determining whether an average distance between two clusters from the plurality of seed clusters is below a threshold value; and
   in response to the average distance between the two seed clusters being below the threshold value, merging the two seed clusters.

2. The computer-implemented method of claim 1 further comprising:
   allocating a semantic label to the two merged seed clusters.

3. The computer-implemented method of claim 1, wherein the initial image is randomly selected.

4. The computer-implemented method of claim 1 further comprising:
   repeating the determining and the merging until all mergeable seed clusters are merged.

5. The computer-implemented method of claim 4 further comprising:
   allocating a semantic label to each seed cluster after all mergeable seed clusters have been merged.

6. The computer-implemented method of claim 5 further comprising:
   receiving a new image;
   classifying the new image in one semantic label of the semantic labels; and
   adding the new image to the one semantic label of the semantic labels.

7. The computer-implemented method of claim 1, wherein the number of times is based on empirical data.

8. The computer-implemented method of claim 1, wherein the number of times is received from an administrator.

9. The computer-implemented method of claim 1, wherein the different image is selected based on average distance from images within the initial seed cluster.

10. The computer-implemented method of claim 9, wherein the different image is selected based on a largest average distance from images within the initial seed cluster.

11. The computer-implemented method of claim 1 further comprising:
    generating a binary tree based on merged seed clusters.

12. The computer-implemented method of claim 11, wherein the binary tree comprises a root, wherein the root is labeled with a semantically meaningful category.

13. The computer-implemented method of claim 11, wherein traversal down the binary tree represents finer levels of granularity.

14. A computer-implemented method for facilitating cascading image clustering, the method comprising:
    selecting an initial image from a set of reviews and further selecting a set of neighboring images to form an initial seed cluster;
    repeating the selecting a number of times with a different image and a different set of neighboring images from the set of reviews, wherein the selecting and the repeating forms a plurality of seed clusters; and
    merging a first seed cluster with a second seed cluster from the plurality of seed clusters to form a first merged seed cluster responsive to determining that similarity between the first seed cluster and the second seed cluster is within a threshold.

15. The computer-implemented method of claim 14 further comprising:
    allocating a semantic label to the first merged seed cluster.

16. The computer-implemented method of claim 14, wherein the initial image is randomly selected.

17. The computer-implemented method of claim 14 further comprising:
    repeating the merging until all mergeable seed clusters are merged.

18. The computer-implemented method of claim 17 further comprising:
    allocating a semantic label to each seed cluster after all mergeable seed clusters have been merged.

19. The computer-implemented method of claim 18 further comprising:
    receiving a new image;
    classifying the new image in one semantic label of the semantic labels; and
    adding the new image to the one semantic label of the semantic labels.

20. The computer-implemented method of claim 14, wherein the number of times is based on empirical data or is received from an administrator.

21. The computer-implemented method of claim 14, wherein the different image is selected based on average distance from images within the initial seed cluster.

* * * * *